(12) United States Patent
Sultan

(10) Patent No.: US 12,441,518 B1
(45) Date of Patent: Oct. 14, 2025

(54) INSULATION COVER FOR VARIABLE SIZE BUCKETS

(71) Applicant: Shane Sultan, Deerfield Beach, FL (US)

(72) Inventor: Shane Sultan, Deerfield Beach, FL (US)

( * ) Notice: Subject to any disclaimer, the term of this patent is extended or adjusted under 35 U.S.C. 154(b) by 0 days.

(21) Appl. No.: 19/260,913

(22) Filed: Jul. 7, 2025

Related U.S. Application Data

(60) Provisional application No. 63/719,344, filed on Nov. 12, 2024.

(51) Int. Cl.
*B65D 25/20* (2006.01)
*F16L 59/02* (2006.01)

(52) U.S. Cl.
CPC .............. *B65D 25/20* (2013.01); *F16L 59/02* (2013.01)

(58) Field of Classification Search
CPC .... B65D 81/18; B65D 81/38; B65D 81/3888; B65D 81/389; B65D 81/3897;
(Continued)

(56) References Cited

U.S. PATENT DOCUMENTS

| | | | | |
|---|---|---|---|---|
| 1,881,873 | A | * 10/1932 | Newcomb | .......... B65D 81/3834 |
| | | | | 126/261 |
| 2,881,936 | A | * 4/1959 | Piker | .................... A47J 41/0077 |
| | | | | 220/592.2 |

(Continued)

FOREIGN PATENT DOCUMENTS

| | | | |
|---|---|---|---|
| EP | 3362757 | B1 | 1/2024 |
| GB | 2600718 | * | 5/2020 |

(Continued)

OTHER PUBLICATIONS

Ubuy, "3.2L Insulated Ice Bucket with Silicone Lid, Tongs & Strainer, Double Wall Stainless Steel Ice Bucket for Parties and Cocktail Bar, Upgraded Silicone Cover Keep Ice Frozen Longer", [Online]. Retrieved from the Internet: <https://www.ubuy.co.in/product/JH3CFRVKO-3-2l-insulated-ice-bucket-with-silicone-lid-tongs-strainer-double-wall-stainless-steel-ice-bucket-for-parties-and-cocktail-bar-upgraded?ref=hm-google-redirect>, (Accessed online Nov. 26, 2024), 12 pages.

*Primary Examiner* — Don M Anderson
(74) *Attorney, Agent, or Firm* — Schwegman Lundberg & Woessner, P.A.

(57) ABSTRACT

An insulation system for temperature-sensitive containers includes an outer insulation component and an inner insulation component. The outer insulation component encapsulates an outer region of a container while the inner insulation component comprises an insulated lid configured to be lowered inside the container. When positioned, the inner and outer components create an insulated environment while leaving exposed an uninsulated portion including the container's lip and upper outer region. The inner insulation component corresponds positionally to the outer insulation coverage. The system may include adjustable components to accommodate containers of varying sizes and an integrated temperature monitoring system with wireless capabilities. The temperature monitoring system can measure container contents' temperature through direct contact sensors and transmit data and alerts when temperatures exceed predetermined thresholds.

20 Claims, 7 Drawing Sheets

(58) Field of Classification Search
CPC ............ B65D 81/3825; B65D 81/3827; B65D 81/3834; B65D 25/20; F25D 31/007; F16L 59/02; A47G 2023/0291; A47G 2023/0275
See application file for complete search history.

(56) References Cited

U.S. PATENT DOCUMENTS

| | | | | |
|---|---|---|---|---|
| 2,954,891 | A * | 10/1960 | Imber | B65D 81/3834 220/592.2 |
| 3,848,766 | A * | 11/1974 | Gantt | B65D 25/287 206/139 |
| 4,163,374 | A * | 8/1979 | Moore | F25D 31/007 220/592.01 |
| 4,510,665 | A * | 4/1985 | Scheurer | B65D 81/3879 156/218 |
| 5,212,963 | A * | 5/1993 | McGinnis | F25D 31/007 62/530 |
| 5,544,568 | A * | 8/1996 | Potgieter | A45C 11/20 220/592.25 |
| 6,222,160 | B1 * | 4/2001 | Remke | B65D 81/3476 219/528 |
| 10,000,315 | B2 | 6/2018 | Faris | |
| 10,098,335 | B2 | 10/2018 | Cooper | |
| 10,883,733 | B2 | 1/2021 | Lee | |
| 11,191,392 | B2 | 12/2021 | Adams, Jr. et al. | |
| 11,596,263 | B1 * | 3/2023 | Siann | A61L 2/07 |
| 11,801,980 | B1 * | 10/2023 | Siann | B65D 51/145 |
| 11,952,172 | B2 | 4/2024 | Rogers et al. | |
| 2005/0078472 | A1 * | 4/2005 | Wiest | F21V 33/0036 362/101 |
| 2008/0092584 | A1 * | 4/2008 | Coppin | F25D 25/005 220/592.2 |
| 2019/0367243 | A1 * | 12/2019 | Tanabe | C01G 31/02 |
| 2019/0383555 | A1 * | 12/2019 | Dorus | F25D 31/007 |
| 2020/0002156 | A1 * | 1/2020 | Owens | B67D 7/80 |
| 2021/0003336 | A1 * | 1/2021 | Lee | B65D 1/0246 |
| 2021/0251427 | A1 * | 8/2021 | Tyler | H05B 1/0261 |
| 2022/0381508 | A1 * | 12/2022 | Jakobsen | F25D 31/007 |
| 2023/0096471 | A1 * | 3/2023 | Lang | B65D 81/3841 220/592.17 |
| 2024/0025625 | A1 * | 1/2024 | Shelton | B65D 81/3879 |
| 2024/0350363 | A1 * | 10/2024 | Mcadams | B65D 81/18 |

FOREIGN PATENT DOCUMENTS

| | | |
|---|---|---|
| JP | 4890150 B2 | 12/2011 |
| JP | 2011250954 A | 12/2011 |
| JP | 2022147338 A | 10/2022 |
| WO | WO-2024191976 A1 | 9/2024 |

* cited by examiner

INSULATION COVER FOR VARIABLE SIZE BUCKETS

CROSS REFERENCE TO RELATED APPLICATION

This is a non-provisional application of, and claims the benefit of priority from, U.S. Provisional Application No. 63/719,344, filed Nov. 12, 2024, which is hereby incorporated by reference in its entirety.

TECHNICAL FIELD

The subject matter disclosed herein generally relates to a special-purpose machine that includes a system for providing insulation covers for variable size buckets, including computerized variants of such special-purpose machines and improvements to such variants, and to the technologies by which such special-purpose machines become improved compared to other special-purpose machines.

BACKGROUND

Five-gallon buckets (as well as other round containers of similar size, such as 6 gallon buckets, 4 gallon buckets, 20-liter pails, and other receptacles) serve as containers across numerous industries and applications, with widespread use in commercial food service for storing and transporting ingredients like sauces, condiments, and bulk food items. The construction industry relies on these versatile containers for materials such as paint, cement, and adhesives, while agricultural operations utilize them for feed storage and produce handling. Temperature control plays an important role in many applications, particularly in food service where perishable ingredients and temperature-sensitive products must maintain food safety standards, such as for items like dairy products and raw meat/fish. In chemical storage applications, these buckets are crucial for temperature-sensitive compounds, industrial solutions requiring specific temperature ranges, and laboratory materials. The medical and pharmaceutical sectors also depend on these containers for storing temperature-dependent medications, transporting biological materials, and preserving medical supplies.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
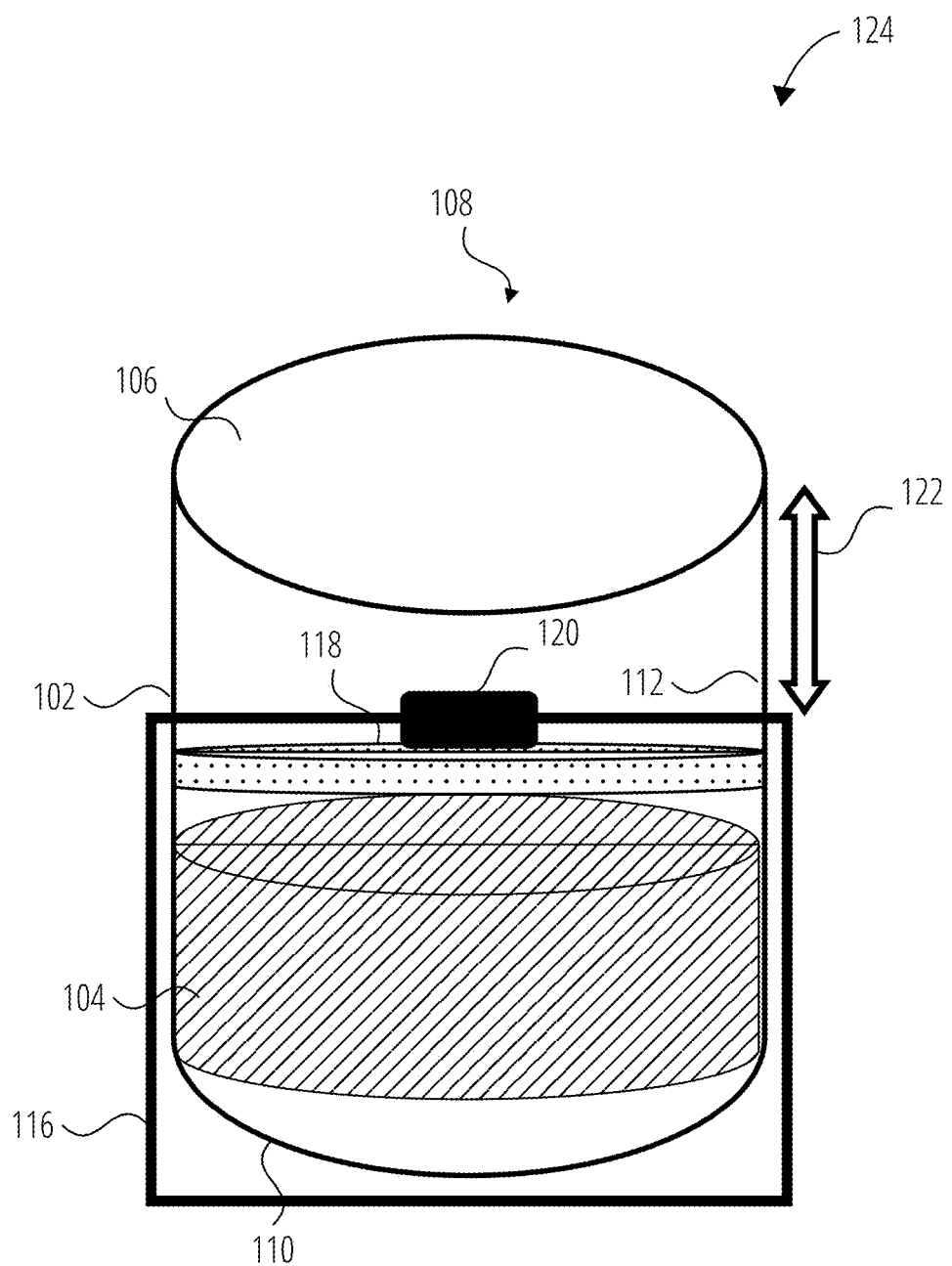
FIG. 1 illustrates a container with an insulation system, according to some examples.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Large industrial containers, such as five gallon buckets, present significant logistical challenges in commercial and industrial settings where temperature control is important. Standard refrigeration units are typically designed for smaller containers, making it difficult or impossible to accommodate five-gallon buckets and similar large-format containers within their confined spaces. This space limitation often forces businesses to maintain separate walk-in coolers or dedicated refrigeration units, which may not be practical or cost-effective for all operations. Additionally, the common alternative of transferring contents from large containers into smaller vessels that can fit in standard refrigerators is both time-consuming and labor-intensive. This transfer process not only increases the risk of contamination and product loss but also requires additional labor hours that could be better utilized elsewhere in the operation. The process of portioning and transferring materials also introduces the possibility of measurement errors and can compromise product consistency, particularly in food service and chemical applications where precise quantities are essential.

Some methods of maintaining temperature control for containers, such as five gallon buckets, exhibit several significant inefficiencies and resource management challenges. Some coolers and insulation systems that fully enclose containers are designed with rigid dimensions, limiting their utility to containers of specific sizes. This inflexibility creates numerous operational inefficiencies and compromises temperature control effectiveness. For example, when these conventional systems are used with containers smaller than their intended size, excess air space develops between the container and insulation walls. This void space creates thermal inefficiencies, as the additional air pocket allows for increased heat transfer and reduces the overall insulating effectiveness. The result is suboptimal temperature maintenance and increased energy consumption to maintain desired temperatures.

As another example, when containers are only partially filled, traditional full-enclosure systems fail to account for the varying content levels. The empty space above the contents creates an additional thermal zone that needs to be regulated, leading to inefficient use of cooling resources and potentially compromised temperature stability for the remaining contents. This scenario is particularly problematic in industries where container contents are gradually depleted over time. The rigid nature of conventional insulation systems also creates storage and transportation inefficiencies. Organizations must maintain multiple sizes of insulation systems to accommodate their various container sizes, leading to increased inventory costs and storage space requirements. This lack of adaptability often results in either over-investment in multiple insulation systems or compromised temperature control when using improperly sized solutions.

These limitations are particularly evident in commercial and industrial settings where container sizes may vary based on supplier, application, or operational requirements. The inability to effectively adapt conventional insulation systems to different container dimensions results in either excessive resource allocation or compromised temperature control, neither of which is optimal for operational efficiency or cost management.

The present application describes a novel system that addresses these technical challenges by providing a two-component insulation solution. The solution includes an outer insulation cover and an inner insulated lid that work in concert to maintain temperature control while allowing easy access to container contents. This innovative system enables the insulation of various container sizes through adjustable and flexible components, eliminating the need for multiple fixed-size solutions. The system's design allows for partial container exposure at the rim while maintaining optimal insulation coverage where needed, reducing thermal inefficiency from excess air space. The addition of integrated temperature monitoring and wireless alert capabilities ensures precise temperature control without requiring container opening. This solution eliminates the need for transferring contents to smaller containers or investing in specialized refrigeration units, while its adaptable design accommodates different fill levels and container dimensions, which improves operational efficiency and resource utilization across various industrial and commercial applications.

Specifically, the disclosed system provides an innovative dual-component insulation solution specifically engineered to address temperature control challenges for large containers, such as five gallon buckets or any other similarly sized container (e.g., 6 gallon bucket, 3 gallon bucket, and so forth). The primary components consist of an outer insulation cover and an inner insulated lid that work synergistically to maintain optimal temperature control while preserving accessibility.

The outer insulation component is designed with flexible (or semi-rigid or partly flexible or rigid), conforming materials that encapsulate the container's exterior surface from its base to a predetermined height. This component incorporates adjustable fastening mechanisms and elastic properties that enable it to accommodate containers of varying dimensions while maintaining consistent insulation performance. The adaptable nature of the outer component eliminates the need for multiple fixed-size solutions, providing operational flexibility across different container formats. The inner insulation component features an insulated lid designed to lower into the container, creating an internal barrier against temperature transfer. This component includes a flexible sealing member around its perimeter that forms an effective seal against the container's inner wall, regardless of slight variations in container diameter. The inner component's position corresponds with the coverage area of the outer insulation component, creating an efficient dual-component insulation system while leaving the container's upper rim, handle of the inner insulation component, and top portion of the inner insulation component, exposed for easy access and verification of contents.

Advanced temperature monitoring capabilities are integrated within the inner insulation component through embedded electronic sensors that maintain direct contact with the container contents. This monitoring system includes wireless communication modules capable of transmitting real-time temperature data and automated alerts when measurements exceed predetermined thresholds. The system can be paired with mobile devices for remote monitoring, enabling proactive temperature management without the need to open the container. The system's design specifically addresses fill-level variations by positioning the inner insulation component at the appropriate height within the container, effectively eliminating excess air space to improve insulation efficiency. This targeted approach to insulation placement ensures optimal temperature maintenance regardless of the container's content level, while the exposed rim allows for visual verification and easy access without compromising the overall insulation integrity. The insulation system can be used to store ice (or frozen contents) with minimal melting in the container over a long period of time, such as 24 hours.

The outer insulation component 116 incorporates advanced multi-layer construction specifically engineered for optimal thermal performance across varying environmental conditions. The insulation materials achieve thermal resistance values (R-values) ranging from, for example, R-8 to R-12, significantly outperforming conventional single-layer insulation systems. The multi-layer design includes a closed-cell foam core with thermal conductivity values of, for example, 0.02-0.04 W/m·K, surrounded by a reflective barrier layer that redirects up to, for example, 97% of radiant heat transfer. The moisture-resistant outer shell maintains these thermal properties even in high-humidity environments, with water vapor transmission rates below 0.1 perm. This material combination enables the system to maintain internal temperatures within ±2° C. of target values for extended periods exceeding 24 hours, while conventional rigid coolers of similar size typically experience temperature drift of, for example, 5-8° C. over the same timeframe.

FIG. 1 illustrates a container, according to some examples. Specifically, FIG. 1 illustrates an insulation system 124 for maintaining temperature control of contents within a container 108. The container 108 includes a bottom wall 110, an outer side wall 102, and an inner wall 112, defining an opening 106 for accessing contents 104 stored within the container.

Five-gallon buckets (as well as other round containers of similar diameter size (but different heights), such as 6 gallon buckets, 4 gallon buckets, 20-liter pails, and other receptacles) serve as container 108 across numerous industries and applications, with widespread use in commercial food service for storing and transporting ingredients like sauces, condiments, and bulk food items (e.g., the contents 104). The construction industry relies on these versatile containers for materials such as paint, cement, and adhesives, while agricultural operations utilize them for feed storage and produce handling.

Temperature control plays an important role in many applications, particularly in food service where perishable ingredients and temperature-sensitive products (e.g., contents 104) must maintain food safety standards, such as for items like dairy products and raw meat/fish. Temperature control also plays an important role in the fishing industry for storing bait and fish at a cold temperature. Storing contents in a temperature controlled environment with minimal heat loss (preventing significant temperature rise over a long period of time, such as 24 hours) in a disposable bucket can be cost effective. This is because the need to dispose of and replace contents of the container due to age and heat loss resulting in contamination can be avoided or eliminated entirely.

In chemical storage applications, these buckets (e.g., the container 108) are crucial for temperature-sensitive compounds, industrial solutions requiring specific temperature ranges, and laboratory materials (e.g., contents 104). The medical and pharmaceutical sectors also depend on these containers for storing temperature-dependent medications (e.g., contents 104), transporting biological materials, and preserving medical supplies (e.g., contents 104).

The container 108 serves important functions in commercial food service for storing and transporting ingredients (e.g., contents 104) like sauces, condiments, and bulk food items that require temperature control. Construction industry applications include paint, cement, and adhesives that may need specific temperature ranges for proper storage and use. Agricultural operations rely on these containers for temperature-sensitive feed storage and produce handling to maintain freshness and prevent spoilage. In chemical and industrial settings, the container 108 is important for storing temperature-sensitive compounds and solutions (e.g., contents 104) that must be maintained within precise temperature ranges. The medical and pharmaceutical sectors utilize the container 108 for medications requiring strict temperature control, biological materials that must remain viable during transport, and various medical supplies that need consistent temperature conditions to maintain their efficacy.

The container 108 can include its own integrated lid that fits over the opening 106 and can be used to cover the insulation component 118 when positioned inside the container 108. This container lid provides an additional sealing layer above the inner insulation component 118 while maintaining the system's temperature control capabilities. The container 108 can feature an integrated handle that can be either exposed or covered by the outer insulation component 116 depending on the desired configuration. When the outer insulation component 116 is positioned to leave the container handle exposed, it enables direct gripping of the container's original handle while still maintaining insulation coverage. Alternatively, the outer insulation component 116 can be configured to overlap and cover the container handle when the system's carrying strap or integrated handles are preferred for transport.

This flexible configuration allows users to choose between: using the container's original handle and lid for traditional handling; utilizing the system's carrying strap while covering the container handle; employing both the container lid and insulation component 118 for enhanced temperature control; and/or accessing the container contents 104 through either the system's inner insulation component 118 or the container's original lid. The ability to use the container's integrated handle and lid in conjunction with the insulation system provides additional versatility while maintaining the system's primary temperature control functionality.

The insulation system 124's modular design enables it to be easily transferred between different containers 108. Users can remove both the insulation component 118 and outer insulation component 116 from one container and apply them to a new container, allowing the original container to be disposed of or repurposed. This interchangeability is facilitated by the insulation system 124's flexible and conforming materials that can adapt to containers of varying dimensions while maintaining consistent insulation performance.

The adaptable nature of both insulation component 118 and outer insulation component 116 supports this interchange capability: the outer insulation component 116's flexible materials and elastic properties enable it to conform to different container dimensions; the inner insulation component 118 can adjust to variations in internal diameters through its flexible sealing member and conforming structure; and/or the insulation system 124's design eliminates the need for permanent attachment to any specific container. This feature is particularly valuable in industrial and commercial settings where containers may need to be replaced due to wear, damage, or hygiene requirements while maintaining the investment in the insulation system. The ability to transfer the system between containers provides cost efficiency and operational flexibility across different applications and environments.

The insulation system 124 can include an outer insulation component 116 that encapsulates (or encloses) the exterior of the container 108 from proximate the bottom wall 110 to a predetermined height along the outer side wall 102. The outer insulation component 116 can be configured with flexible, conforming materials that enable it to accommodate containers of varying dimensions while maintaining consistent insulation performance. The outer insulation component 116 can, in some cases, include a carrying strap (e.g., a shoulder strap) to enable ease of transporting the container 108 including the insulation system 124 while the insulation system 124 continues to be applied to the container 108.

The outer insulation component 116 can be enhanced with integrated storage features to improve functionality while maintaining its primary insulation capabilities. The outer insulation component 116 can include external zippered compartments for storing items like temperature monitoring accessories, container cleaning supplies, or documentation. Multiple storage pockets of varying sizes can be incorporated into the outer surface to accommodate items such as measuring tools, labels, markers, or personal items while transporting the container 108.

The flexible (and/or compressible), conforming materials of the outer insulation component 116 can be designed with reinforced sections to support these storage features without compromising the insulation performance. Additional utility features may include: mesh pockets for quick-access items; insulated external compartments for separate temperature-sensitive items; tool loops or attachment points; ID card/label windows; adjustable compression straps; reinforced bottom panel with protective feet; and/or multiple carrying handles or grip points. These storage and utility features particularly benefit applications in food service, medical supply transport, and chemical handling where associated items need to be kept with the container while maintaining organization and accessibility. The addition of these features complements the insulation system 124 existing carrying strap capability for enhanced portability and practical utility across various industrial and commercial applications.

The outer insulation component 116 can be constructed using multiple layers of high-performance insulating materials that enable temperature control while maintaining flexibility. Suitable materials include closed-cell foam insulation, which provides excellent thermal resistance while remaining pliable, thermal reflective materials that redirect radiant heat, and moisture-resistant outer layers that protect the internal insulation. The multi-layered construction allows the outer insulation component 116 to conform to various container dimensions through elastic properties and adjustable fastening mechanisms, while specialized sealing materials ensure consistent thermal performance across different container sizes.

The outer insulation component 116 can incorporate strategically positioned external pockets designed with varying configurations to maximize utility while maintaining thermal performance. These pockets can include zippered compartments with insulated walls to store temperature-sensitive accessories such as backup temperature probes, calibration tools, or pharmaceutical items requiring controlled storage conditions. The pockets can be positioned at multiple locations around the circumference of the outer insulation component 116, including side-mounted utility pockets for frequently accessed items, rear-mounted document storage compartments for temperature logs or safety data sheets, and front-mounted quick-access pockets for measurement tools or labels. The pocket design incorporates reinforced attachment points and water-resistant materials to ensure durability during transport and handling. Additionally, the pockets can feature internal organization systems including elastic retention straps, mesh dividers, and tool loops to maintain organization of stored items while preventing interference with the insulation system's primary temperature control function.

The insulation system 124 can incorporate various proven cold-storage materials and technologies, including phase change materials (PCMs) that maintain stable temperatures through thermal energy absorption, high-density polyethylene foam that provides durability with flexibility, and thermally-enhanced fabrics with moisture-wicking properties. These materials work together to create an effective insulation barrier that adapts to container 108 variations while preventing thermal transfer. The design of the outer insulation component 116 specifically addresses the need for both insulation performance and dimensional flexibility through strategic material selection and layered construction that maintains consistent thermal resistance regardless of how the material stretches or conforms to different container sizes.

The materials of the outer insulation component 116 are specifically selected to provide optimal insulation for temperature-sensitive contents 104 across various industries, from food service applications requiring precise temperature control for perishables to medical and pharmaceutical needs for maintaining specific temperature ranges. The flexible yet thermally-efficient materials enable the system to effectively insulate contents like dairy products, temperature-sensitive compounds, biological materials, and industrial solutions while accommodating the varying container sizes and fill levels commonly encountered in commercial and industrial settings.

An inner insulation component 118 can include an insulated lid configured to be lowered into the container 108 through opening 106. The inner insulation component 118 can be made of the same or different material as the outer insulation component 116. The inner insulation component 118 including the insulated lid is configured to be lowered into the container 108 through opening 106, with its position corresponding to the height of the outer insulation component 116 to create an efficient dual-component insulation system. In some cases, optionally though not required, the inner insulation component 118 can include a flexible sealing member 204 around its perimeter that forms an effective seal against the container's inner wall 112 as it is lowered to the appropriate height. When included, this flexible sealing member helps maintain temperature control, but the inner insulation component 118 can still provide effective insulation without the flexible sealing member 204 through its coordinated positioning with the outer insulation component 116.

The inner insulation component 118 is specifically designed to be positioned at a height that aligns with the coverage area of the outer insulation component 116, creating one or more coordinated insulation zones while leaving the container's upper rim exposed for easy access. This targeted positioning ensures optimal temperature maintenance by eliminating excess air space that could compromise insulation efficiency.

The inner insulation component 118 is specifically designed to be positioned at a height that aligns with the coverage area of the outer insulation component 116, creating one or more coordinated insulation zones while maintaining an exposed region 122 at the upper portion of the container. This exposed region 122 includes the container's rim area and a portion of the outer wall, enabling easy access for content verification and removal while preserving the system's insulation integrity.

The strategic positioning of the inner insulation component 118 relative to the outer insulation component 116 creates an efficient dual-component insulation system that eliminates excess air space that could compromise temperature control. This fully encapsulates the container's contents. The exposed region 122 is intentionally maintained to provide practical access without sacrificing insulation performance, as the coordinated coverage between the inner and outer components maintains optimal thermal efficiency below this access zone. The system's design specifically addresses fill-level variations by positioning the inner insulation component 118 at the appropriate height within the container, effectively eliminating excess air space that typically compromises insulation efficiency in traditional solutions. This targeted approach to insulation placement ensures optimal temperature maintenance regardless of the container's content level, while the exposed region 122 allows for visual verification and easy access without compromising the overall insulation integrity.

The exposed region 122 also facilitates the system's adaptability to containers of varying dimensions, as it provides flexibility in the positioning of the inner insulation component 118 while maintaining consistent thermal performance through the coordinated coverage with the outer insulation component 116. This design element addresses the technical challenges of maintaining temperature control while preserving accessibility, particularly in commercial and industrial applications where frequent access to container contents is required.

The inner insulation component 118 can be constructed from rigid, compressible, flexible, and/or semi-flexible foam core materials surrounded by a moisture-resistant outer layer. As the inner insulation component 118 is inserted through opening 106, its structure allows it to dynamically conform to variations in the container's inner diameter while maintaining its insulating properties. The foam core materials provide structural integrity while still allowing enough flexibility for the inner insulation component 118 to adjust and create optimal contact with the container's inner walls 112 during insertion. This adaptable conforming capability is enhanced by the moisture-resistant outer layer, which helps the inner insulation component 118 slide smoothly into position while maintaining its protective barrier against condensation and moisture.

The system's dual-component design strategically combines these conforming capabilities of the inner insulation component 118 with the flexible nature of the outer insulation component 116. The inner insulation component 118's ability to conform to the container's internal geometry works in concert with the outer insulation component 116's flexible materials to create comprehensive thermal coverage. This coordinated interaction between the rigid yet conforming inner core and the flexible outer layer enables optimal thermal performance through consistent surface contact and elimination of air gaps, while maintaining durability and consistent insulation performance. The inner insulation component 118's conforming properties also allow it to maintain effective insulation even when containers have slight variations in internal diameter or surface irregularities, ensuring reliable temperature control across different container specifications and conditions.

A handle 120 is integrated into the inner insulation component 118 to facilitate precise lowering and positioning of the insulated lid within the container 108, ensuring proper alignment with the outer insulation component 116 while maintaining easy access for removal when needed. The insulation system 124 can incorporate magnetic sensors positioned within either or both the inner insulation component 118 and the outer insulation component 116 that work in conjunction with the integrated temperature monitoring insulation system 124. When the inner insulation component 118 is lowered to the optimal height corresponding to the outer insulation component 116, the aligned magnetic sensors trigger visual indicators (e.g., lights or a display of the inner insulation component 118) and/or audible alarms/indicators (e.g., using speakers embedded in the inner insulation component 118) to confirm proper positioning, ensuring effective dual-component insulation performance. The handle 120 enables controlled placement and easy removal while the sensor-based alignment system provides clear confirmation of correct positioning for optimal temperature maintenance.

The inner insulation component 118 and outer insulation component 116 can incorporate magnetic elements integrated into their respective perimeters to enhance the sealing and alignment capabilities of the insulation system 124. The outer insulation component 116 can include magnetic strips or elements embedded within its upper edge, while corresponding magnetic elements can be integrated into the perimeter of the inner insulation component 118. As the inner insulation component 118 is lowered into position, these magnetic elements attract and engage with each other through the container wall to create an additional sealing mechanism.

This magnetic engagement system provides several benefits including: creating a supplementary seal beyond the optional flexible sealing member; helping guide the inner insulation component 118 into proper alignment with the outer insulation component 116; providing tactile feedback when correct positioning is achieved; maintaining consistent positioning during use and transport; and enabling quick release for easy removal while maintaining seal integrity. The magnetic elements can be strategically positioned to correspond with the predetermined heights of both inner insulation component 118 and outer insulation component 116, working in concert with the temperature monitoring system to ensure optimal thermal performance. When properly aligned, the magnetic attraction helps maintain the coordinated coverage between inner insulation component 118 and outer insulation component 116 while still allowing the exposed portion of the container rim (opening 106) to remain accessible. This magnetic system complements the handle-based positioning control and can work independently or in conjunction with the flexible sealing member to maintain effective dual-component insulation performance.

The magnetic alignment system provides precise positioning feedback through strategically placed neodymium magnetic elements embedded within both the inner insulation component 118 and outer insulation component 116. The magnetic elements are positioned at predetermined intervals around the perimeter, with magnetic field strengths of 1,200-1,500 Gauss that provide sufficient attraction force through container walls up to 3 mm thick while remaining easily separable for component removal. When the inner insulation component 118 reaches optimal positioning height corresponding to the outer insulation component 116 coverage, the magnetic elements align and create a tactile "snap" sensation that confirms proper placement. This magnetic engagement system generates a holding force of 8-12 pounds per linear foot of perimeter contact, sufficient to maintain positioning during normal handling and transport while allowing intentional removal through the integrated handle 120. The magnetic positioning system eliminates guesswork in component placement and ensures consistent thermal performance by maintaining the critical alignment between inner and outer insulation zones.

The inner insulation component 118 can include a flexible sealing member (shown as flexible sealing member 204 in FIG. 2) that forms an effective seal against the inner wall 112 of the container 108. The inner insulation component 118 corresponds positionally with the coverage area of the outer insulation component 116 to create an efficient dual-component insulation system. The flexible sealing member 204 can be constructed as a peripheral rubber gasket that expands and contracts to maintain consistent sealing engagement with containers of varying internal diameters.

The inner insulation component 118 incorporates a vacuum relief mechanism to address the negative pressure differential that can develop when the component creates an effective seal against the container's inner wall 112. This mechanism includes a pressure equalization button or valve system positioned on the upper surface of the inner insulation component 118, allowing controlled air entry to break the vacuum seal formed by the flexible sealing member 204. The vacuum relief mechanism can be implemented as a spring-loaded button that temporarily opens an air passage when depressed, a twist-valve system that allows graduated pressure release, or an automatic pressure relief valve that activates when vacuum pressure exceeds predetermined thresholds. This feature significantly reduces the extraction force required to remove the inner insulation component 118, preventing damage to both the sealing member and container while maintaining ease of use. The mechanism is designed with a positive seal when not activated, ensuring no compromise to the insulation system's thermal performance during normal operation, while providing immediate pressure relief when removal is required.

The vacuum relief system can include visual and tactile indicators to guide proper operation, such as colored markings that indicate when the mechanism is properly sealed versus when pressure relief is active. Advanced embodiments may incorporate the vacuum relief mechanism into the handle 120 design, allowing single-handed operation where pressing the handle activates pressure relief while simultaneously providing leverage for component removal. The system can also include safety features such as pressure relief that automatically activates when extraction force exceeds safe handling limits, preventing potential injury from sudden vacuum release. This integrated approach to vacuum management ensures that the strong sealing capabilities of the flexible sealing member 204 do not compromise user experience or component longevity, while maintaining the system's primary function of creating effective thermal barriers around the container contents 104.

This adaptable sealing system enables the inner insulation component 118 to form an effective temperature barrier regardless of slight variations in container diameter. The flexible sealing member 204 works in conjunction with the positioning of the inner insulation component 118, which corresponds to the coverage area of the outer insulation component 116, creating an efficient dual-component insulation system. The design of the flexible sealing member 204 specifically addresses the challenges of varying container sizes through its ability to maintain consistent contact pressure against the container's inner wall 112 while accommodating dimensional variations. The outer insulation component 116 can be configured to provide optimal insulation by having a height of the outer insulation component 116 that surrounds and makes contact with the outer side wall 102 of the container 108 be equal to or greater than a position of the inner insulation components 118 where the inner insulation component 118 makes contact with the inner wall 112 of the container 108.

Examples of suitable flexible sealing member 204 configurations include any combination of one or more of: a multi-durometer rubber gasket that provides both flexibility and sealing force; an expandable foam-core seal with moisture-resistant coating; a composite seal combining rigid and flexible materials for optimal sealing performance; a temperature-resistant elastomeric seal that maintains flexibility across various temperature ranges, and so forth. The flexible sealing member 204 is engineered to maintain its sealing properties even as containers are gradually depleted of contents, ensuring consistent temperature control regardless of fill levels. This targeted approach to sealing, combined with the corresponding coverage of the outer insulation component 116, creates an effective thermal barrier while preserving accessibility through the exposed rim portion of the container.

The flexible sealing member 204 demonstrates exceptional adaptability across the full range of standard container dimensions through its variable compression design. The sealing member can compress up to 15% of its original thickness while maintaining effective sealing pressure of 2-4 PSI against the container's inner wall 112. This compression range enables the inner insulation component 118 to accommodate containers with internal diameter variations of up to 0.6 inches while maintaining consistent thermal performance. The sealing member's elastomeric properties allow it to conform to minor surface irregularities and manufacturing tolerances commonly found in industrial containers, ensuring reliable sealing even with containers that deviate from perfect cylindrical geometry. Performance testing demonstrates that the flexible sealing member maintains effective thermal barriers across temperature ranges from −10° C. to +60° C., with seal integrity remaining constant throughout repeated insertion and removal cycles exceeding 500 uses.

A handle 120 is provided on the inner insulation component 118 to facilitate removal and placement of the insulated lid. The system maintains an exposed region 122 at the upper portion of the container, including the rim area, which enables easy access and visual verification of contents while preserving insulation integrity. The positioning of the inner insulation component 118 and outer insulation component 116 creates a coordinated insulation barrier that effectively maintains temperature control of the contents 104 while accommodating varying container sizes and fill levels through their flexible and adjustable design features.

The inner insulation component 118 and outer insulation component 116 can be sized to accommodate containers with diameters ranging from approximately 11.8 inches to 12.31 inches and heights ranging from approximately 12.9 inches to 14.7 inches. The outer insulation component 116 can be configured with flexible materials to conform to this range of container diameters, with an unstretched inner diameter of approximately 11.7 inches that can expand to approximately 12.5 inches to accommodate the full range of standard 5-gallon container sizes. The height of the outer insulation component 116 can extend from the bottom wall 110 to a height of approximately 10-12 inches along the sidewall 102, leaving approximately 2-4 inches of the upper container 108 exposed for access and visibility.

The inner insulation component 118 can be sized with an outer diameter of approximately 11.7-11.75 inches to enable smooth insertion while maintaining effective contact with the container's inner wall 112. This sizing allows the inner component to conform to containers across the full diameter range while maintaining proper sealing and insulation performance. The flexible sealing member 204 can allow the inner insulation component 118 to accommodate a larger standard container diameter of approximately 12-13 inches.

For optimal thermal performance, the inner insulation component 118 can be adjusted to multiple height configurations ranging from approximately 1-12 inches to correspond with varying content levels and the height of the outer insulation component 116. This range of heights enables the insulation system 124 to maintain efficient dual-component insulation while accommodating the full spectrum of standard 5-gallon container heights approximately 12 inches to 15 inches.

The insulation system components can be sized proportionally relative to standard 5-gallon bucket dimensions or other sized buckets or containers 108. The outer insulation component 116 can be configured to cover approximately 70-85% of the container's total height, leaving the upper 15-30% exposed for access and visibility. For a typical 14.5-inch tall container, this translates to the outer insulation component 116 extending approximately 10-12.3 inches up the sidewall.

The inner insulation component 118 can be sized to have an outer diameter approximately > (greater than or equal to) 100% of the container's largest inner diameter (the container's opening 106) to ensure a snug fit while maintaining effective contact. As the inner insulation component 118 is pushed down the container 108, the outer diameter of the inner insulation component 118 compresses up to 10% or more to maintain effective insulation and maintain contact with the container's inner diameter.

Figure 2:
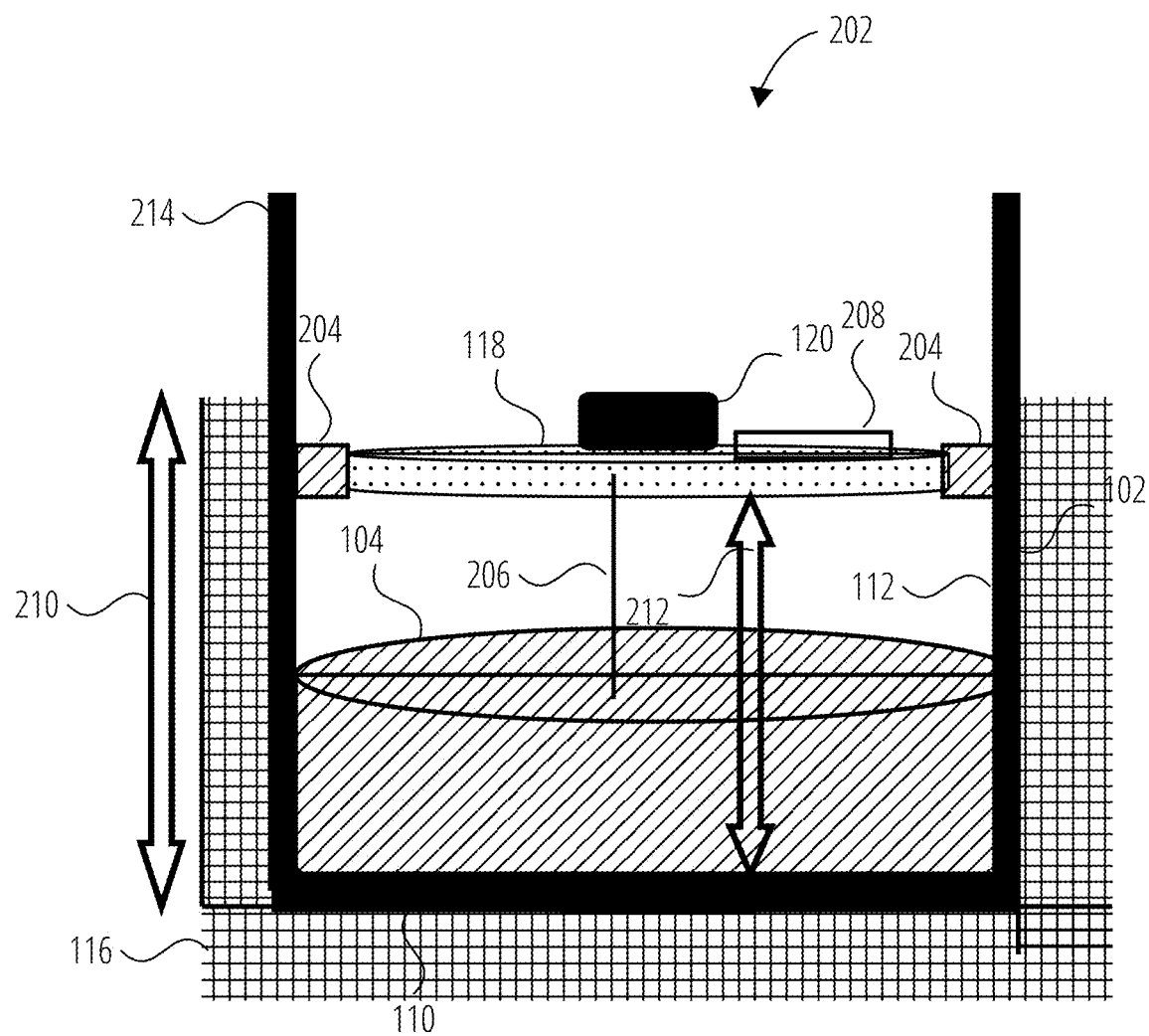
FIG. 2 illustrates a container with an insulation system, according to some examples.

FIG. 2 illustrates a container 108 using the insulation system 124, according to some examples. Specifically, FIG. 2 illustrates a cross sectional side view of container 202 of the insulation system 124 showing the detailed arrangement of components.

The container 108 is shown with its outer side wall 102, inner wall 112, and contents 104. The outer insulation component 116 encapsulates the exterior of the container 108 from near the bottom wall up to a predetermined height along the outer wall. The height of outer insulation component 210 can be the same as the outer wall height 214 of the container 108 or shorter than the outer wall height 214 of the container 108. In cases where the height of outer insulation component 210 is shorter than the height of the container 108, maximum insulation may only be achieved for contents 104 having a top height that is at or lower than the height of outer insulation component 210. Namely, the container 108 may need to be filled with contents 104 not up to the maximum fill or capacity of the container 108 but up to a fill level corresponding to the height of outer insulation component 210 to provide the maximum insulation.

The inner insulation component 118 is shown positioned within the container 108, featuring a flexible sealing member 204 (that is formed around an entire perimeter of the inner insulation component 118) that creates an effective seal against the container's inner wall 112. The inner insulation component 118 extends to a height 212 that corresponds with the coverage area of the outer insulation component 116. The height 212 of inner insulation component 118 can correspond to the top layer of the contents 104 and may, in some cases, physically make contact with the top layer of the contents 104.

A handle 120 is integrated into the inner insulation component 118 to facilitate placement and removal. The system includes a probe 206 for temperature monitoring that connects to a computing system 208 for tracking and transmitting temperature data. The computing system 208 may be implemented in whole or in part using the software architecture 602 and/or machine 700 of FIG. 6 and FIG. 7.

The cross sectional side view of container 202 demonstrates how the inner and outer insulation components work together while maintaining an exposed region at the upper portion of the container 108. The flexible sealing member 204 is shown making contact with the inner wall 112 to create an effective barrier that, in tandem with the outer insulation component 116, create an effective insulation barrier completely around the entire contents 104 of the container 108.

The probe 206 is positioned to maintain direct contact with the contents 104, enabling accurate temperature monitoring through the computing system 208. This monitoring capability allows for real-time temperature tracking without requiring the container to be opened, maintaining the integrity of the insulation system. In some cases, the probe 206 can include a camera and light emission device (e.g., a flashlight) to transmit a real-time stream of video showing the contents 104 and/or periodically transmit an image of the contents 104 to a remote user device.

The computing system 208 incorporates sophisticated temperature monitoring capabilities through embedded electronic sensors that maintain continuous contact with the container contents 104. The computing system 208 features wireless communication modules capable of transmitting real-time temperature data and generating automated alerts whenever measurements exceed user-defined temperature thresholds. Users can input these threshold values either directly through an interface on the lid or remotely via a connected mobile device.

The temperature monitoring system utilizes multiple temperature sensors (e.g., probe 206) strategically positioned at different heights within the container to provide comprehensive temperature tracking across varying fill levels. This multi-sensor configuration ensures accurate temperature monitoring regardless of content volume or distribution. The system includes a probe 206 that maintains direct contact with contents 104, enabling precise temperature measurement through the computing system 208 without requiring the container to be opened, thereby preserving the insulation system's integrity.

The temperature monitoring system incorporates multiple redundant sensors positioned at strategic heights within the container to provide comprehensive thermal profiling of the contents 104. The primary temperature sensor maintains direct contact with the contents through the probe 206, while secondary sensors monitor ambient air temperature within the insulated chamber and external environmental conditions. The system's wireless communication capabilities operate on multiple frequency bands including Bluetooth Low Energy (2.4 GHz) and Wi-Fi (2.4/5 GHz) to ensure reliable connectivity across various industrial environments. Temperature measurements are accurate to ±0.1° C. with response times under 30 seconds for rapid thermal change detection. The integrated alert system can be configured with multiple threshold levels, including warning alerts at user-defined temperatures and critical alerts for temperature excursions that could compromise product safety. Data logging capabilities store up to 10,000 temperature readings with timestamps, enabling comprehensive The monitoring system features a display visible on the outer surface of the inner insulation component 118 that presents current temperature readings in real-time. When measurements exceed the predetermined temperature thresholds, the system automatically transmits alerts through any one or combination of multiple channels: visual indicators on the lid's display, wireless notifications to connected mobile devices, and audible alerts from the integrated monitoring system. This multi-modal alert system ensures that users are promptly notified of any temperature variations that could affect the contents 104.

The wireless communication capabilities allow the system to be paired with mobile devices for remote monitoring, enabling proactive temperature management without physically accessing the container. Users can adjust temperature thresholds, monitor current readings, and receive alerts through their mobile devices, providing flexible and convenient temperature control management. The system's comprehensive monitoring and alert features make it particularly valuable for applications requiring precise temperature control, such as food service, medical supplies, and chemical storage.

Figure 3:
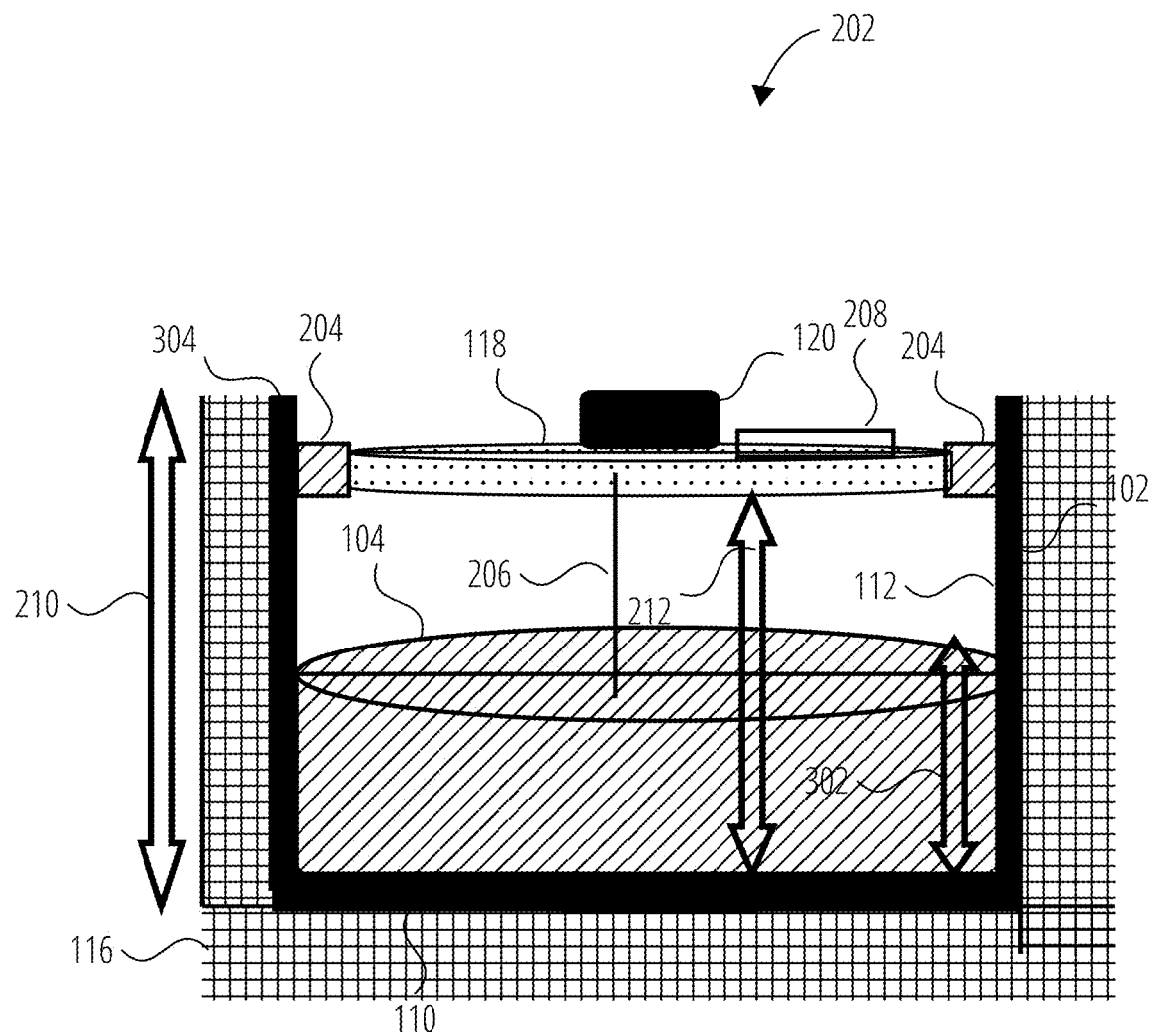
FIG. 3 illustrates a container with an insulation system, according to some examples.

FIG. 3 illustrates a container 108 including the insulation system 124, according to some examples. Specifically, FIG. 3 shows a different configuration where the outer insulation component 116 fully encapsulates the container's exterior surface from its base to the top, in contrast to FIG. 2 where the outer insulation component 116 only reached a predetermined height below the container rim. The height of outer insulation component 210 now matches the outer wall height 304 of the container 108.

This configuration demonstrates the process of encapsulating an outer region of the container with the outer insulation component as a complete coverage configuration, while still maintaining the coordinated positioning of the inner insulation component 118 to create effective dual-component insulation. The dual-component insulation system is composed of both the inner insulation component 118 and the outer insulation component 116.

This full-height coverage variation is achieved through the flexible, conforming materials of the outer insulation component that enable it to extend fully up the container's exterior while maintaining consistent insulation performance. The system still preserves accessibility through the container opening, with the inner insulation component being lowered to a position that corresponds with the higher coverage of the outer component in this configuration.

As previously mentioned, the container 108 features outer side wall 102 and inner wall 112 containing the temperature-sensitive contents 104 up to content level 302. The outer insulation component 116 wraps around the exterior of the container, providing primary insulation coverage from near the bottom up to a predetermined height.

Within the container 108, the inner insulation component 118 is positioned with its flexible sealing member 204 creating an effective seal against the container's inner wall 112. The inner insulation component 118 extends to height 212, which corresponds precisely with the coverage area of the outer insulation component 116, creating one or more coordinated insulation zones.

The system's design specifically addresses fill-level variations by positioning the inner insulation component 118 at height 212 relative to content level 302, effectively eliminating excess air space that typically compromises insulation efficiency. This targeted approach to insulation placement ensures optimal temperature maintenance regardless of the container's content level, while maintaining an exposed region at the upper portion for easy access. The probe 220 extends down to content level 302 to maintain direct contact with contents 104, enabling accurate temperature monitoring through computing system 208 without requiring the container 108 to be opened.

The dual-component insulation system addresses critical limitations of existing container insulation solutions through its coordinated coverage approach and adaptive sizing capabilities. Unlike conventional rigid coolers that create inefficient air gaps when used with smaller containers or partial fill levels, the present system eliminates thermal inefficiencies by positioning the inner insulation component 118 at the optimal height corresponding to actual content levels. Comparative testing demonstrates that the coordinated dual-component design maintains target temperatures 40-60% longer than conventional single-component insulation systems of equivalent material volume. The system's modular design enables cost-effective scaling across different container sizes without requiring multiple fixed-dimension solutions, reducing inventory requirements by up to 75% compared to conventional size-specific insulation systems. The exposed region 122 design maintains accessibility while preserving thermal performance, addressing the common trade-off between insulation effectiveness and practical usability that limits conventional full-enclosure systems.

Figure 4:
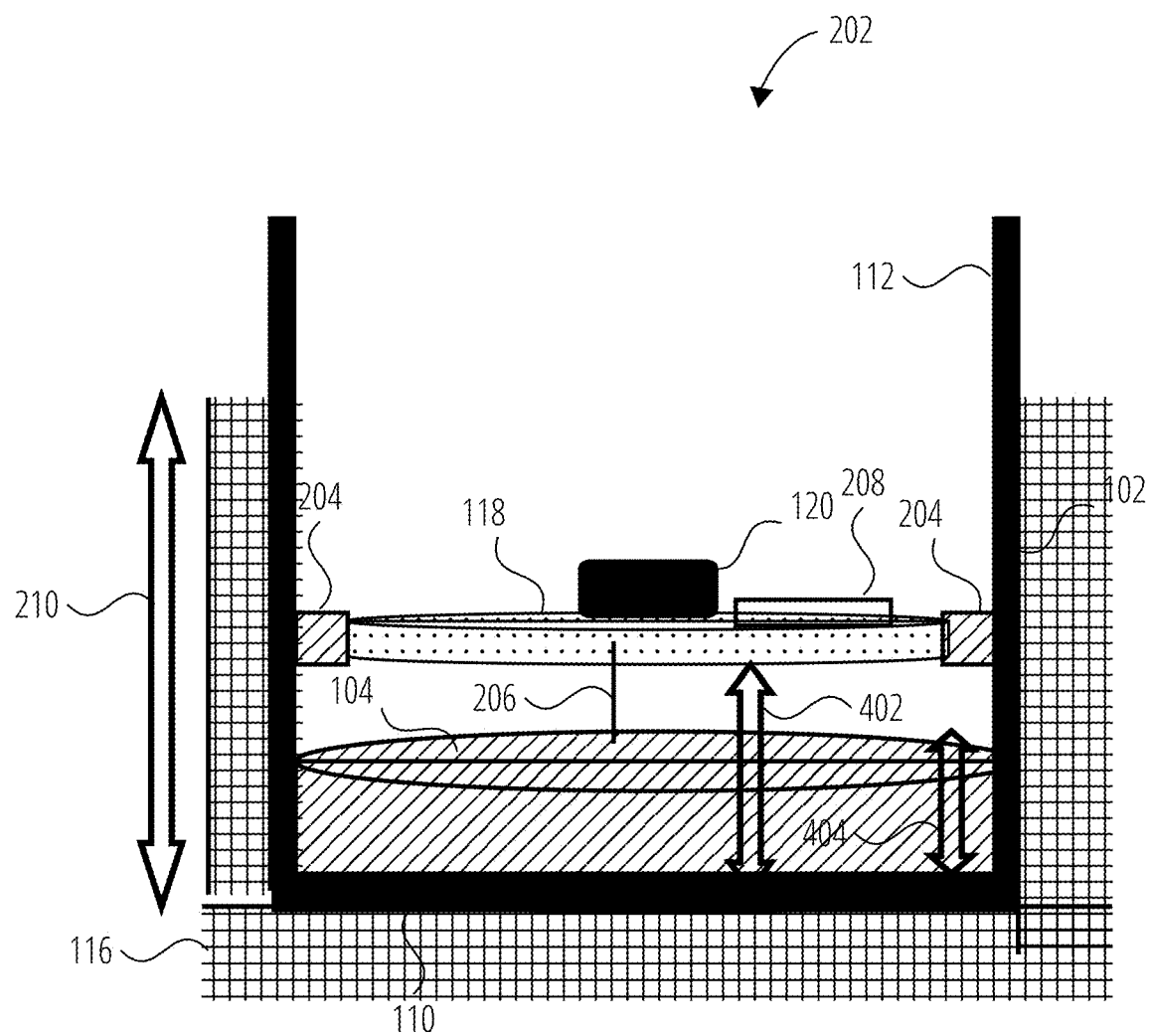
FIG. 4 illustrates a container with an insulation system, according to some examples.

FIG. 3 and FIG. 4 demonstrate the system's adaptability to different content levels within the container. In FIG. 3, the inner insulation component is positioned at a higher level corresponding to a higher content level. In contrast, FIG. 4 shows the inner insulation component 118 lowered to a height of inner insulation component 402 at a position to accommodate a level of contents 404 of the container contents than that shown in FIG. 3.

This adjustable positioning capability allows the inner insulation component 118 to be placed at the appropriate height relative to the content level, effectively eliminating excess air space that could compromise insulation efficiency. The system maintains optimal temperature control by allowing the inner insulation component 118 to be lowered to a position when contents 104 are at a lower level, while still maintaining the coordinated coverage with the outer insulation component 116.

The flexible sealing member continues to create an effective seal against the container's inner wall 112 regardless of whether the inner insulation component 118 is positioned higher as in FIG. 3 or lower at a position representing the height of inner insulation component 402, as shown in FIG. 4. This adaptability ensures consistent thermal performance while eliminating inefficient air pockets above the contents, regardless of the fill level.

Figure 5:
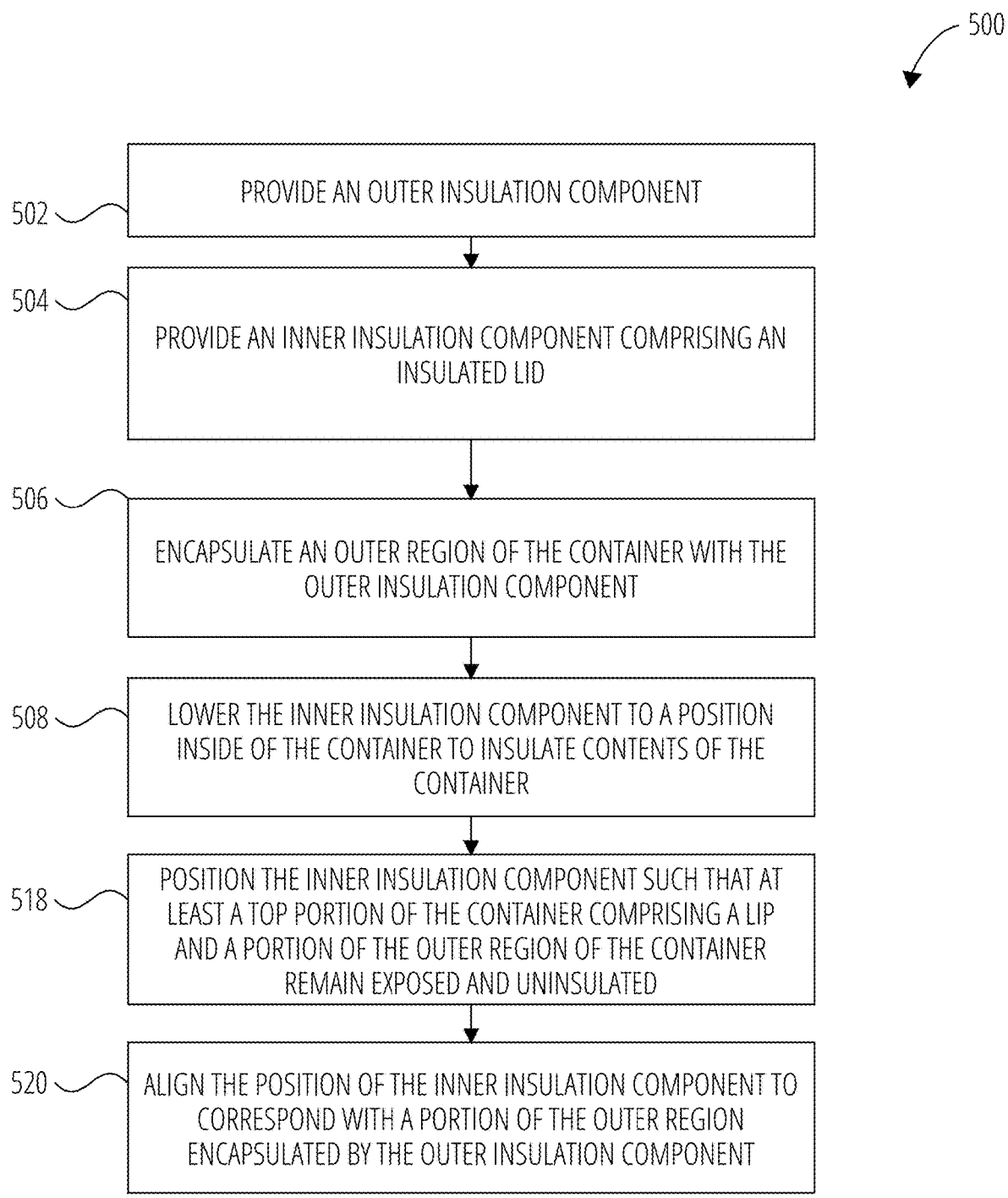
FIG. 5 illustrates a routine for insulating a container, according to some examples.

FIG. 5 illustrates a routine 500 (e.g., method or process) in accordance with some examples. The operations discussed in connection with FIG. 5 can be performed sequentially, in parallel, and in any suitable order.

In operation 502, an outer insulation component is provided, as discussed above.

In operation 504, an inner insulation component including an insulated lid with a flexible sealing member is provided, as discussed above.

In operation 506, an outer region of the container, with the outer insulation component 116, is encapsulated, as discussed above.

In operation 508, the inner insulation component is lowered to a position inside of the container to insulate contents of the container, as discussed above.

In operation 518, the inner insulation component is positioned such that at least a top portion of the container including a lip and a portion of the outer region of the container remain exposed and uninsulated, as discussed above.

In operation 520, the position of the inner insulation component is aligned to correspond with a portion of the outer region encapsulated by the outer insulation component, as discussed above.

Figure 6:
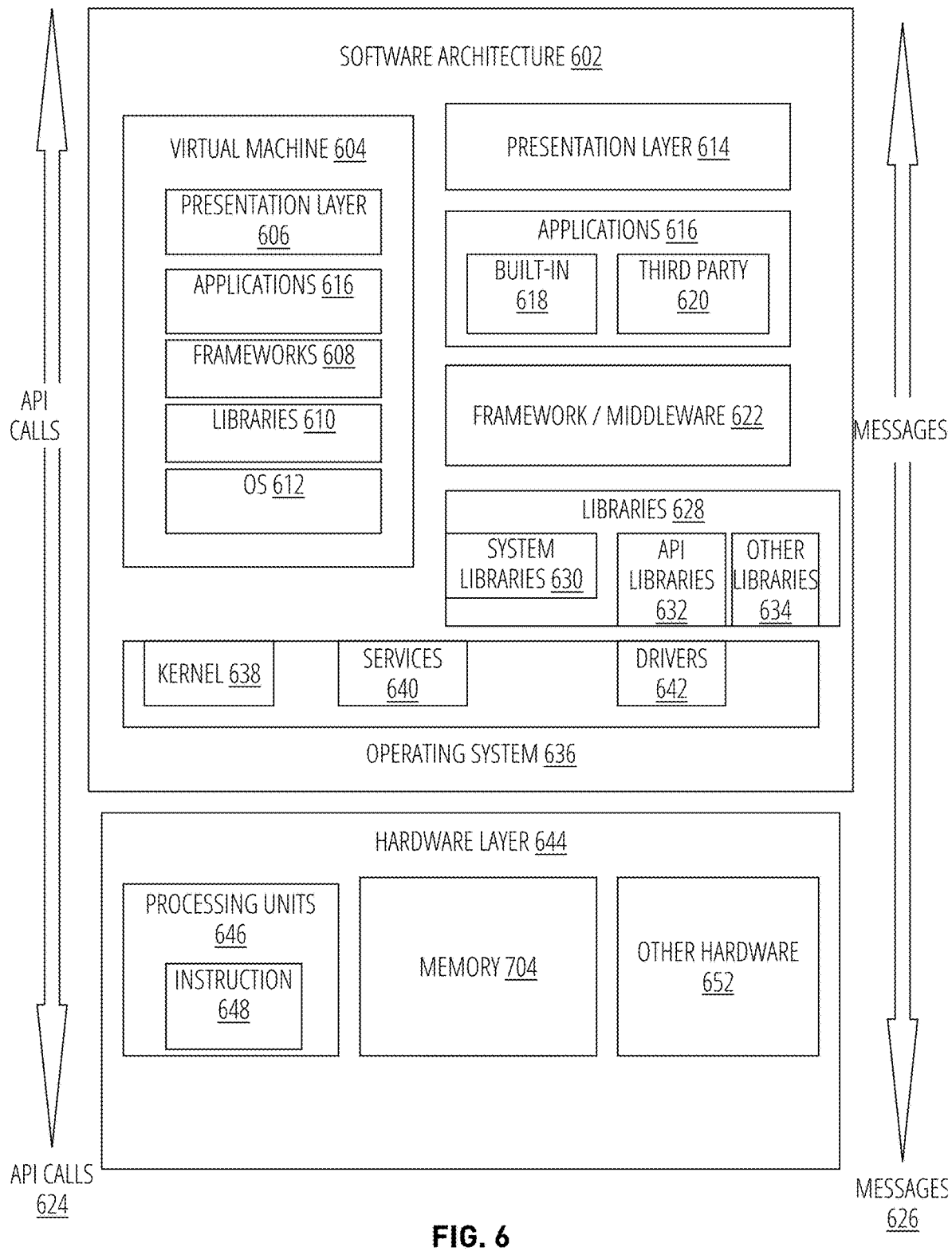
FIG. 6 is a block diagram illustrating a representative software architecture, which may be used in conjunction with various hardware architectures herein described, according to some examples.

FIG. 6 is a block diagram illustrating an example of a software architecture 602 that may be installed on a machine, according to some examples. FIG. 6 is merely a non-limiting example of a software architecture, and it will be appreciated that many other architectures may be implemented to facilitate the functionality described herein. The software architecture 602 may be executing on hardware such as a machine 700 of FIG. 7 that includes, among other things, processors 710, memory 704, and input/output (I/O) components 542. A representative hardware layer 644 is illustrated and can represent, for example, the machine 700 of FIG. 7. The representative hardware layer 644 comprises one or more processing units 646 having associated executable instructions 648. The executable instructions 648 represent the executable instructions of the software architecture 602. The hardware layer 644 also includes memory 704, which also have the executable instructions 648. The hardware layer 644 may also comprise other hardware 652, which represents any other hardware of the hardware layer 644, such as the other hardware illustrated as part of the machine 700.

The instructions 648 may be transmitted or received over the network using a transmission medium via a network interface device (e.g., a network interface component included in the communication components 740) and utilizing any one of a number of well-known transfer protocols (e.g., hypertext transfer protocol (HTTP)). Similarly, the instructions 648 may be transmitted or received using a transmission medium via the coupling (e.g., a peer-to-peer coupling) to the devices. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 648 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" are non-transitory computer-readable media and specifically exclude carrier waves, modulated data signals, and other such media, at least some of which are covered under the term "signal medium."

In the example architecture of FIG. 6, the software architecture 602 may be conceptualized as a stack of layers, where each layer provides particular functionality. For example, the software architecture 602 may include layers such as an operating system 636, libraries 628, framework/middleware 622, applications 616, and a presentation layer 614. Operationally, the applications 616 or other components within the layers may invoke API calls API calls 624 through the software stack and receive a response, returned values, and so forth (illustrated as messages 626) in response to the API calls 624. The layers illustrated are representative in nature, and not all software architectures have all layers. For example, some mobile or special-purpose operating systems may not provide a framework/middleware 622 layer, while others may provide such a layer. Other software architectures may include additional or different layers.

The operating system 636 may manage hardware resources and provide common services. The operating system 636 may include, for example, a kernel 638, services 640, and drivers 642. The kernel 638 may act as an abstraction layer between the hardware and the other software layers. For example, the kernel 638 may be responsible for memory management, processor management (e.g., scheduling), component management, networking, security settings, and so on. The services 640 may provide other common services for the other software layers. The drivers 642 may be responsible for controlling or interfacing with the underlying hardware. For instance, the drivers 642 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 628 may provide a common infrastructure that may be utilized by the applications 616 and/or other components and/or layers. The libraries 628 typically provide functionality that allows other software modules to perform tasks in an easier fashion than by interfacing directly with the underlying operating system 636 functionality (e.g., kernel 638, services 640, or drivers 642). The libraries 628 may include system libraries 630 (e.g., C standard library) that may provide functions such as memory allocation functions, string manipulation functions, mathematic functions, and the like. In addition, the libraries 628 may include API libraries 632 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 628 may also include a wide variety of other libraries 634 to provide many other APIs to the applications 616 and other software components/modules.

The frameworks/middleware 622 (also sometimes referred to as middleware) may provide a higher-level common infrastructure that may be utilized by the applications 616 or other software components/modules. For example, the frameworks/middleware 622 may provide various graphical user interface functions, high-level resource management, high-level location services, and so forth. The frameworks/middleware 622 may provide a broad spectrum of other APIs that may be utilized by the applications 616 and/or other software components/modules, some of which may be specific to a particular operating system or platform.

The applications 616 include built-in applications 618 and/or third-party applications 620. Examples of representative built-in applications 618 may include, but are not limited to, a home application, a contacts application, a browser application, a book reader application, a location application, a media application, a messaging application, or a game application.

The third-party applications 620 may include any of the built-in applications 618, as well as a broad assortment of other applications. In a specific example, the third-party applications 620 (e.g., an application developed using the Android™ or iOS™ software development kit (SDK) by an entity other than the vendor of the particular platform) may be mobile software running on a mobile operating system such as iOS™, Android™, or other mobile operating systems. In this example, the third-party applications 620 may invoke the API calls 624 provided by the mobile operating system such as the operating system 636 to facilitate functionality described herein.

The applications 616 may utilize built-in operating system functions (e.g., kernel 638, services 640, or drivers 642), libraries (e.g., system libraries 630, API libraries 632, and other libraries 634), or framework/middleware 622 to create user interfaces to interact with users of the system. Alternatively, or additionally, in some systems, interactions with a user may occur through a presentation layer, such as the presentation layer 614. In these systems, the application/module "logic" can be separated from the aspects of the application/module that interact with the user.

Some software architectures utilize virtual machines. In the example of FIG. 6, this is illustrated by a virtual machine 604. The virtual machine 604 creates a software environment where applications/modules can execute as if they were executing on a hardware machine (e.g., the machine 700 of FIG. 7). The virtual machine 604 is hosted by a host operating system (e.g., the operating system 636) and typically, although not always, has a virtual machine monitor, which manages the operation of the virtual machine 604 as well as the interface with the host operating system (e.g., the operating system 636). A software architecture executes within the virtual machine 604, such as an operating system 612, libraries 610, frameworks 608, applications 616, or a presentation layer 606. These layers of software architecture executing within the virtual machine 604 can be the same as corresponding layers previously described or may be different.

Figure 7:
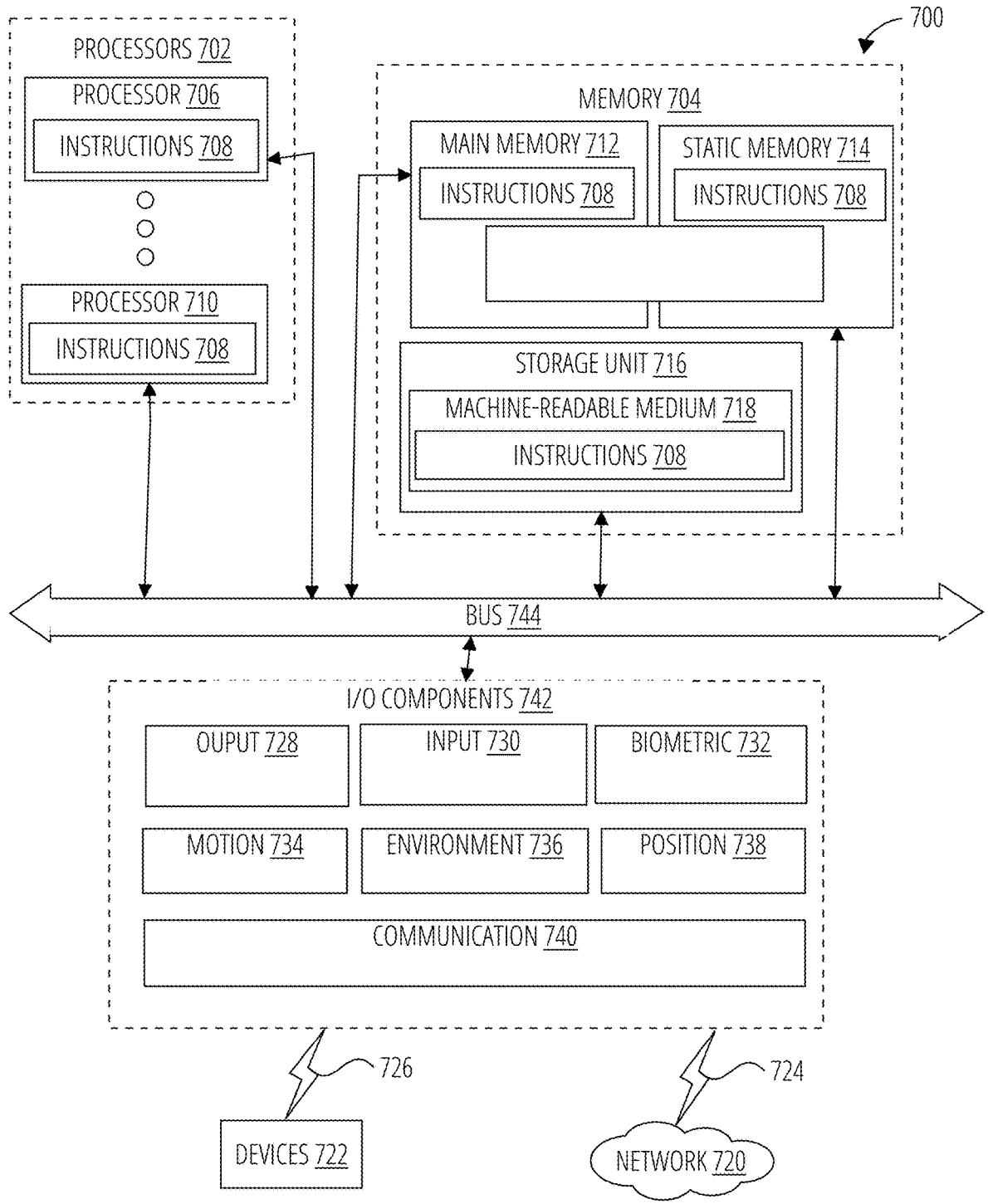
FIG. 7 is a diagrammatic representation of a machine in the form of a computer system within which a set of instructions may be executed for causing the machine to perform any one or more of the methodologies discussed herein, according to some examples.

FIG. 7 is a diagrammatic representation of the machine 700 within which instructions 708 (e.g., software, a program, an application, an applet, an app, or other executable code) for causing the machine 700 to perform any one or more of the methodologies discussed herein may be executed. For example, the instructions 708 may cause the machine 700 to execute any one or more of the methods described herein. The instructions 708 transform the general, non-programmed machine 700 into a particular machine 700 programmed to carry out the described and illustrated functions in the manner described. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 708, sequentially or otherwise, that specify actions to be taken by the machine 700. Further, while only a single machine 700 is illustrated, the term "machine" shall also be taken to include a collection of machines that individually or jointly execute the instructions 708 to perform any one or more of the methodologies discussed herein.

The machine 700 may include processors 702, memory 704, and I/O components 742, which may be configured to communicate with each other via a bus 744. In an example, the processors 702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 706 and a processor 710 that execute the instructions 708. The term "processor" is intended to include multi-core processors that may comprise two or more independent processors (sometimes referred to as "cores") that may execute instructions contemporaneously. Although FIG. 7 shows multiple processors 702, the machine 700 may include a single processor with a single core, a single processor with multiple cores (e.g., a multi-core processor), multiple processors with a single core, multiple processors with multiples cores, or any combination thereof.

The memory 704 includes a main memory 712, a static memory 714, and a storage unit 716, both accessible to the processors 702 via the bus 744. The main memory 704, the static memory 714, and storage unit 716 store the instructions 708 embodying any one or more of the methodologies or functions described herein. The instructions 708 may also reside, completely or partially, within the main memory 712, within the static memory 714, within machine-readable medium 718 within the storage unit 716, within at least one of the processors 702 (e.g., within the processor's cache memory), or any suitable combination thereof, during execution thereof by the machine 700.

The I/O components 742 may include a wide variety of components to receive input, provide output, produce output, transmit information, exchange information, capture measurements, and so on. The specific I/O components 742 that are included in a particular machine will depend on the type of machine. For example, portable machines such as mobile phones may include a touch input device or other such input mechanisms, while a headless server machine will likely not include such a touch input device. It will be appreciated that the I/O components 742 may include many other components that are not shown in FIG. 7. In various examples, the I/O components 742 may include output components 728 and input components 730. The output components 728 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 730 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further examples, the I/O components 742 may include biometric components 732, motion components 734, environmental components 736, or position components 738, among a wide array of other components. For example, the biometric components 732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 734 include acceleration sensor components (e.g., accelerometer), gravitation sensor components, rotation sensor components (e.g., gyroscope), and so forth. The environmental components 736 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 742 further include communication components 740 operable to couple the machine 700 to a network 720 or devices 722 via a coupling 724 and a coupling 726, respectively. For example, the communication components 740 may include a network interface component or another suitable device to interface with the network 720. In further examples, the communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 722 may be another machine or any of a wide variety of peripheral devices (e.g., a peripheral device coupled via a USB).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geolocation, location via Wi-Fi® signal triangulation, location via detecting an NFC beacon signal that may indicate a particular location, and so forth.

The various memories (e.g., memory 704, main memory 712, static memory 714, and/or memory of the processors 702) and/or storage unit 716 may store one or more sets of instructions and data structures (e.g., software) embodying or used by any one or more of the methodologies or functions described herein. These instructions (e.g., the instructions 708), when executed by processors 702, cause various operations to implement the disclosed examples.

The instructions 708 may be transmitted or received over the network 720, using a transmission medium, via a network interface device (e.g., a network interface component included in the communication components 740) and using any one of a number of well-known transfer protocols (e.g., hypertext transfer protocol (HTTP)). Similarly, the instructions 708 may be transmitted or received using a transmission medium via the coupling 726 (e.g., a peer-to-peer coupling) to the devices 722.

Although examples have been described, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

In view of the disclosure above, various examples are set forth below. It should be noted that one or more features of an example, taken in isolation or combination, should be considered within the disclosure of this application.

Example 1. An insulation system comprising: an outer insulation component configured to encapsulate an outer region of a container; and an inner insulation component comprising an insulated lid configured to be lowered to a position inside of the container to insulate contents of the container, when positioned inside of the container at least a top portion of the container comprising a lip and a portion of the outer region of the container remaining exposed and uninsulated, the positioning of inner insulation component corresponding to a portion of the outer region encapsulated by the outer insulation component, the inner insulation component comprising a flexible sealing member.

Example 2. The insulation system of any one of Example 1, wherein the container comprises approximately a five gallon bucket or any bucket having a similar shape with different height than the five gallon bucket.

Example 3. The insulation system of any one of Examples 1-2, wherein the flexible sealing member comprises a rubber gasket.

Example 4. The insulation system of any one of Examples 1-3, wherein the flexible sealing member comprises a peripheral gasket configured to engage with an inner surface of the container.

Example 5. The insulation system of any one of Examples 1-4, wherein the outer insulation component comprises a flexible insulation material configured to conform to the outer region of the container.

Example 6. The insulation system of any one of Examples 1-5, wherein the outer insulation component extends from a bottom of the container to a first height, and the inner insulation component extends from the lip to a second height when positioned inside the container.

Example 7. The insulation system of any one of Examples 1-6, wherein the inner insulation component comprises a rigid or flexible or semi-flexible foam core surrounded by a moisture-resistant outer layer.

Example 8. The insulation system of any one of Examples 1-7, wherein the outer insulation component comprises multiple layers of insulating material to keep contents of the container cold.

Example 9. The insulation system of any one of Examples 1-8, wherein the inner insulation component comprises a handle configured to facilitate removal of the insulated lid from the container.

Example 10. The insulation system of any one of Examples 1-9, wherein the inner insulation component comprises an image capture device or temperature sensor.

Example 11. The insulation system of any one of Examples 1-10, wherein the inner insulation component is sized to fit containers having different internal diameters or different heights.

Example 12. The insulation system of any one of Examples 1-11, wherein the flexible sealing member is configured to expand or contract to maintain sealing engagement with inner surfaces of containers having different internal diameters.

Example 13. The insulation system of any one of Examples 1-12, wherein the outer insulation component comprises elastic material configured to stretch (the elastic material can be pliable but does not stretch beyond a threshold amount between 2-7 centimeters) to accommodate containers of different circumferences.

Example 14. The insulation system of any one of Examples 1-13, further comprising a temperature monitoring system disposed within the inner insulation component.

Example 15. The insulation system of any one of Examples 1-14, wherein the temperature monitoring system comprises: a temperature sensor configured to contact contents within the container; and a wireless communication device configured to transmit temperature data to a mobile device.

Example 16. The insulation system of any one of Examples 1-15, wherein the wireless communication device is configured to transmit an alert in response to detecting that a measured temperature exceeds a predetermined threshold.

Example 17. The insulation system of any one of Examples 1-16, wherein the temperature monitoring system comprises a display visible on an outer surface of the inner insulation component, the display presenting a current temperature reading received from the temperature sensor, the temperature monitoring system comprising an input component configured to receive user input specifying the predetermined threshold.

Example 18. The insulation system of any one of Examples 1-17, wherein the temperature monitoring system comprises multiple temperature sensors positioned at different heights within the container.

Example 19. A method of insulating a container comprising: providing an outer insulation component; providing an inner insulation component comprising an insulated lid with a flexible sealing member; encapsulating an outer region of the container with the outer insulation component; lowering the inner insulation component to a position inside of the container to insulate contents of the container; positioning the inner insulation component such that at least a top portion of the container comprising a lip and a portion of the outer region of the container remain exposed and uninsulated; and aligning the position of the inner insulation component to correspond with a portion of the outer region encapsulated by the outer insulation component.

Example 20. A temperature control system for a container having a sidewall, a bottom wall, and an upper rim defining an opening, the temperature control system comprising: an outer insulation cover configured to surround at least a portion of an exterior of the container, the outer insulation cover extending from proximate the bottom wall to a first height along the sidewall; and an insulated lid configured to be received within the opening of the container, the insulated lid extending downwardly within the container to a second height along the sidewall, the first height of the outer insulation cover and the second height of the insulated lid are configured to leave an exposed portion of the upper rim of the container.

What is claimed is:

1. An insulation system for a container, the container comprising a lip, a top portion, and an outer region, the insulation system comprising: an outer insulation component configured to cover only a portion of the outer region of the container; and an inner insulation component comprising an insulated lid configured to be lowered to a position inside of the container to insulate contents of the container, when positioned inside of the container at least the top portion of the container comprising the lip and a portion of the outer region of the container remaining exposed and uninsulated, the positioning of the inner insulation component being aligned in a vertical direction with the portion of the outer region covered by the outer insulation component.

2. The insulation system of claim 1, wherein the container comprises approximately a five gallon bucket.

3. The insulation system of claim 1, further comprising the container, the container having a container lid and container handle.

4. The insulation system of claim 1, the inner insulation component comprising a flexible sealing member, wherein the flexible sealing member comprises a rubber gasket.

5. The insulation system of claim 4, wherein the flexible sealing member comprises a peripheral gasket configured to engage with an inner surface of the container.

6. The insulation system of claim 1, wherein the outer insulation component comprises a flexible insulation material configured to conform to the outer region of the container.

7. The insulation system of claim 1, wherein the outer insulation component extends from a bottom of the container to a first height, and the inner insulation component extends from the lip to a second height when positioned inside the container.

8. The insulation system of claim 1, wherein the inner insulation component comprises a compressible, rigid, flexible, or semi-flexible foam core surrounded by a moisture-resistant outer layer.

9. The insulation system of claim 1, wherein the outer insulation component comprises multiple layers of insulating material to keep contents of the container cold.

10. The insulation system of claim 1, wherein the inner insulation component comprises a handle configured to facilitate removal of the insulated lid from the container.

11. The insulation system of claim 1, wherein the inner insulation component comprises an image capture device or temperature sensor.

12. The insulation system of claim 1, wherein the inner insulation component is sized to fit different capacity containers having different internal diameters.

13. The insulation system of claim 1, the inner insulation component comprising a flexible sealing member, wherein the flexible sealing member is configured to expand or contract to maintain sealing engagement with inner surfaces of containers having different internal diameters.

14. The insulation system of claim 13, wherein the outer insulation component comprises elastic material configured to stretch to accommodate containers of different circumferences.

15. The insulation system of claim 1, further comprising a temperature monitoring system disposed within the inner insulation component.

16. The insulation system of claim 15, wherein the temperature monitoring system comprises:
   a temperature sensor configured to contact contents within the container; and
   a wireless communication device configured to transmit temperature data to a mobile device.

17. The insulation system of claim 16, wherein the wireless communication device is configured to transmit an alert in response to detecting that a measured temperature exceeds a predetermined threshold.

18. The insulation system of claim 17, wherein the temperature monitoring system comprises a display visible on an outer surface of the inner insulation component, the display presenting a current temperature reading received from the temperature sensor, the temperature monitoring system comprising an input component configured to receive user input specifying the predetermined threshold.

19. A method of insulating a container comprising: providing an outer insulation component; providing an inner insulation component comprising an insulated lid; covering only a portion of an outer region of the container with the outer insulation component; positioning the inner insulation component such that at least a top portion of the container comprising a lip and a portion of the outer region of the container remain exposed and uninsulated; and aligning in a vertical direction the position of the inner insulation component to correspond with the portion of the outer region covered by the outer insulation component.

20. A temperature control system for a container having a sidewall, a bottom wall, and an upper rim defining an opening, the temperature control system comprising: an outer insulation cover configured to surround only a portion of an exterior of the container, the outer insulation cover extending from proximate the bottom wall to a first height along the sidewall; and an insulated lid configured to be received within the opening of the container, the insulated lid extending downwardly within the container to a second height along the sidewall, the first height of the outer insulation cover and the second height of the insulated lid are configured to leave an exposed portion of the upper rim of the container.

* * * * *